United States Patent [19]
Yoda et al.

[11] 4,254,400
[45] Mar. 3, 1981

[54] IMAGE DATA PROCESSOR

[75] Inventors: Haruo Yoda, Kodaira; Jun Motoike, Hachiouji, both of Japan

[73] Assignee: Hitachi, Ltd., Japan

[21] Appl. No.: 98,074

[22] Filed: Nov. 28, 1979

[30] Foreign Application Priority Data

Dec. 13, 1978 [JP] Japan .................. 53-153142

[51] Int. Cl.³ .............................................. G06K 9/50
[52] U.S. Cl. .................. 340/146.3 MA; 340/146.3 Y; 340/146.3 Q
[58] Field of Search .......... 340/146.3 MA, 146.3 AE, 340/146.3 Y, 146.3 S, 146.3 Q, 146.3 AH, 146.3 AC; 358/105, 106, 107

[56] References Cited

U.S. PATENT DOCUMENTS

| | | | |
|---|---|---|---|
| 3,297,993 | 1/1967 | Clapper | 340/146.3 AE |
| 3,701,095 | 10/1972 | Yamaguchi et al. | 340/146.3 MA |
| 3,927,309 | 12/1975 | Fujiwara et al. | 340/146.3 S |
| 3,936,800 | 2/1976 | Ejiri et al. | 340/146.3 MA |
| 3,959,771 | 5/1976 | Uno et al. | 340/146.3 Y |
| 4,014,000 | 3/1977 | Uno et al. | 340/146.3 Q |
| 4,130,819 | 12/1978 | Engelmann | 340/146.3 AC |

*Primary Examiner*—Leo H. Boudreau
*Attorney, Agent, or Firm*—Craig & Antonelli

[57] ABSTRACT

An image data processor for recognizing the degree of variation in the object in the image by dividing an image plane into a plurality of block regions and by sequentially comparing an input image and a background image for each of the divided block regions. The data to be used for comparing the input image and the background image are either the number of occurences of preset amplitude relationships of the signals which are produced by extracting the signals of plural pairs of picture elements in spacially preset relative position relationships from the output signals of an image pickup device while sequentially shifting the positions of the picture elements and by accomplishing the counting operations for each pair of the picture elements when the picture element extracted is included in a preset block region or the data which are produced by linearly transforming the data of the number of occurences.

3 Claims, 6 Drawing Figures

IMAGE DATA PROCESSOR

BACKGROUND OF THE INVENTION

1. Field of the Invention

The present invention relates to an image data processor, and more particularly to an image data processor which enables the existence of variation in an image to be recognized by extracting a feature from image data and by comparing the extracted feature with the feature which has been extracted and stored in advance by a similar processing.

2. Description of the Prior Art

In case a monitor for monitoring a scene in a TV camera to automatically judge whether or not any change takes place in the image of the TV camera and which region the change takes place in is taken into consideration, the most promising system is that, in which the image is received and stored in advance so that the stored image is compared with the image being received at the monitoring time thereby to detect the difference inbetween.

Since, however, the quantity of the data of the whole region of the image is remarkably extensive, the capacity of the memory is so increased that the monitor as a whole becomes highly expensive if the data are directly stored and compared. On the other hand, since the values of the image data themselves are liable to be fluctuated in accordance with the intensity or incident angle of light, it is rather advantageous in view of the countermeasures for noises that any geometrical feature is extracted for comparison from the image data than that the comparison is made with the image data themselves. Upon production of the aforementioned monitor, therefore, it is the most important technique that the image data are tried to be compressed to a feature vector having as little data as possible.

From the standpoint thus far described, there has been conventionally proposed by the Inventors a system, in which an image picked up is divided into plural block regions and the image data divided in the respective block regions are coded for the respective regions so that the data thus coded are sequentially compared with the coded reference image data stored in advance for the respective regions and corresponding to the background in the respective block regions thereby to detect the degree of the change in the image by counting the block regions where the compared results become inconsistent (Reference should be made to U.S. Pat. No. 3,936,800.). According to the aforementioned system, each of the block regions divided is composed of a plurality of picture elements which are two-dimentionally, and the changing direction of the brightness for each of the aforementioned picture elements is judged to count the number of the picture elements in each direction so that the image of each region is coded into a feature vector. For example, a two-dimentional plane is divided in eight-directions, for which are provided counters, respectively, each of which is preset to generate an output "1" when a counting operation higher than a preset value is performed. Then, in accordance with the judged results of the changing direction of brightness for each picture element, a corresponding counter is brought into its counting operation so that the feature of one block region can be displayed with the codes of 8 bits composed of the outputs of eight counters when the judgements of the whole picture elements in the region are completed. The system thus far described has an advantage that the comparison of two image for each block region can be performed with data of eight bits irrespective of the number of the picture elements in said block region.

According to the system proposed in the aforementioned U.S. Pat. No. 3,936,800, more specifically, the classification in the direction of brightness for each picture element is performed by sequentially extracting a two dimentional partial region, which is composed of one group of picture elements of n×n, from an object image, by comparing the picture elements in n number of right and left sides to obtain a brightness gradient $f_x$ averaged in the X direction, and by similarly comparing the picture elements in n number of upper and lower sides to obtain a brightness gradient $f_y$ in the Y direction. From these two pieces of information, $$\theta = \tan^{-1}(f_y/f_x)$$

is calculated, and to which direction the calculated value belongs is judged. The results thus obtained are generated as the brightness direction of the picture elements representative of the aforementioned block regions extracted. Thus, a classifying circuit requires various kinds of resistors for the calculations of the values $\theta$.

SUMMARY OF THE INVENTION

It is therefore an object of the present invention to provide an image data processor which is improved from the aforementioned conventional system so that the feature vector of an image can be extracted with more ease.

In order to attain the above object, the image data processor according to the present invention comprises:

first means for converting an image including an object to be recognized into spacially quantitized picture element signals;

second means for extracting plural pairs of the picture element signals, which are in spacially preset relative position relationships, from the output of the first-named means while sequentially shifting the picture element positions to be extracted; and third means connected with the second-named means for counting the number of occurences of preset amplitude relationships between the plural pairs of the input signals when the output signals from the second-named means indicate the picture element which are included in a preset region of the image, whereby the output of the third-named means is used as the feature vector of a preset block region of the image for comparison with a reference image.

According to the present invention, the second-named means can be simply constructed of an image extraction circuit including a shift register for sequentially storing at least one raster scanning line of the picture element signals generated from the first-named means, and a plurality of shift registers made capable of generating signals in parallel bit by bit. Moreover, the processing operations of the second- and third-named means are so simple that they can be replaced by the simple operations of a data processor for extracting plural scanning lines of the picture element data to compare the same with the picture element data in preset positional relationship.

The counted data of the third-named means indicate the feature vectors, which are different in accordance with the characteristics of an image pattern, as will be described later. In order to further compress the quantity of data, those feature vectors may be linearly transformed and referred to the reference image data.

BRIEF DESCRIPTION OF THE DRAWINGS

The foregoing and other object, advantages and modes of operation of the present invention will be understood from the following detailed description when read in connection with the accompanying drawings, in which.

DESCRIPTION OF THE PREFERRED EMBODIMENT

The embodiment of the present invention will be described in the following with reference to the accompanying drawings.

Figure 1:
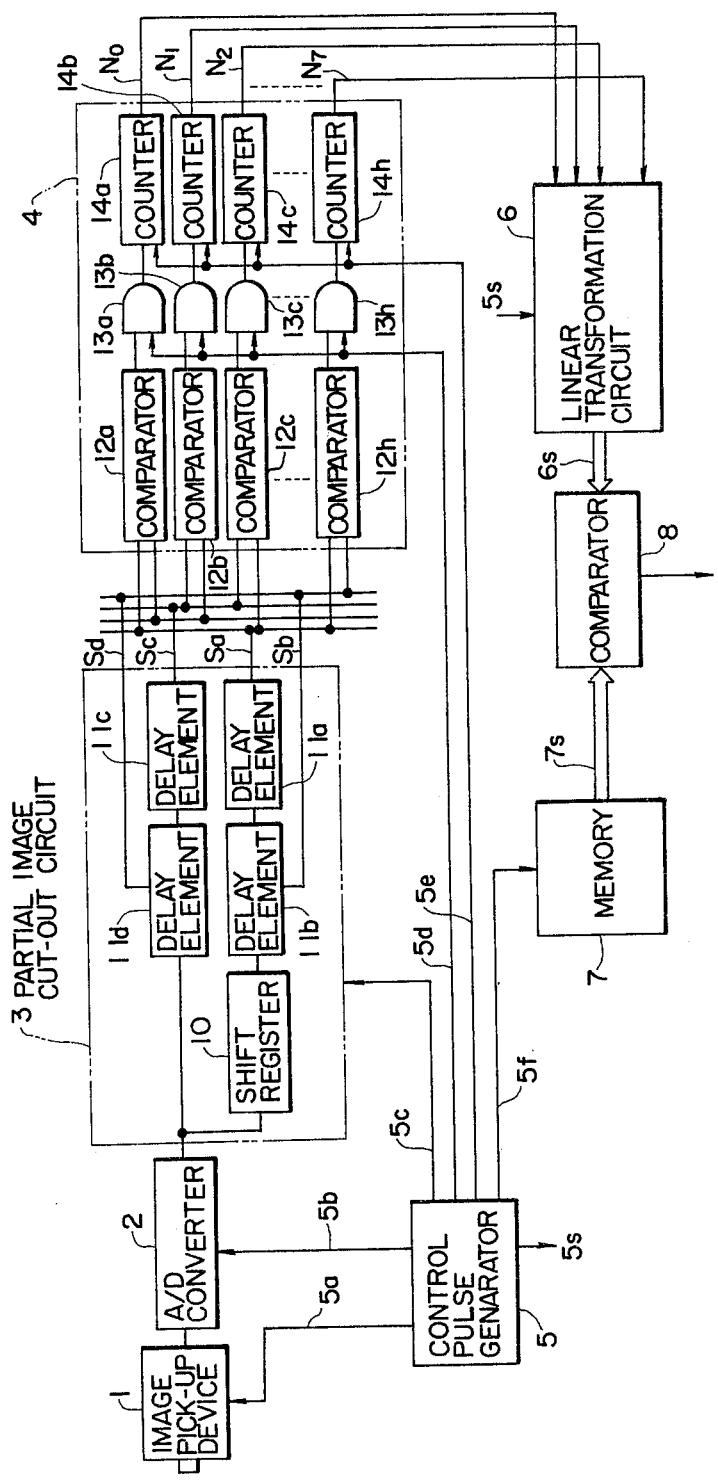
FIG. 1 is a block diagram showing an image data processor according to one embodiment of the present invention.

In FIG. 1, reference numeral 1 indicates an image pickup device such as a TV camera. Numeral 2 indicates an A/D converter for sampling and converting video signals into digital signals. Numeral 3 indicates a partial image data cut-out circuit which is composed a delay circuit such as a shift register 10 for storing image data corresponding to one horizontal laster scanning line of a TV, and a plurality of delay elements such as shift registors 11a, 11b, 11c and 11d, each of which is made operative to store image data corresponding to one picture element.

Those circuit elements are operated in response to scanning signals 5a, sampling signals 5b and shift pulses 5c, all of which are supplied from a control pulse generator 5. By suitably synchronizing the shift pulses 5c with the TV scanning signals 5a, the shift registers 11c to 11d are supplied with the picture element data of 2×2, which are adjacent to one another on the image plane, as shown at letters a, b, c and d in FIG. 2. Those data are consecutively renewed in a manner to scan the image plane in synchronism with the TV scanning operations. As a result, the image data $Sa$ to $Sd$ holding the same spacial relative position relationship on the image plane are consecutively generated in parallel from the shift registers 11a to 11d. By increasing the number of the shift registers constituting the partial image data cut-out circuit 4, on the other hand, the number of the picture elements located in the cut-out region can be accordingly increased so that the picture element data can be generated in any spacial relative position relationship.

Figure 3:
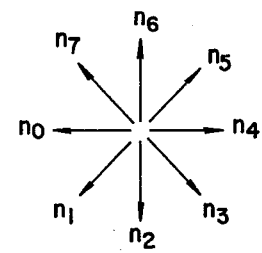
FIG. 3 is an explanatory view illustrating the relationships between the amplitudes of the picture element data and the brightness directions of picture elements.

The relationships in amplitude among the picture elements $Sa$ to $Sd$ are judged by the eight comparators 12a to 12h of a feature extraction circuit 4. For example, the comparator 12a compares the data $Sa$ and $Sb$ to generate signals "1" for $Sa>Sb$. This implies that the picture element a is brighter than the picture element b, i.e., that the direction of brightness is located in the direction of arrow $n_0$ in FIG. 3.

Likewise, the comparators 12b to 12h respectively judge the conditions of $Sc>Sb$, $Sc>Sa$, $Sd>Sa$, $Sb>Sa$, $Sb>Sc$, $Sa>Sc$ and $Sa>Sd$ to generate the signals "1" if the respective conditions are satisfied. The fact that those conditions are satisfied implies that the directions of the brightness are located in the directions of arrows $n_1$ to $n_7$ of FIG. 3, respectively.

The output signals of the aforementioned comparators 12a to 12h are fed as count pulses through AND gates 13a to 13h to counters 14a to 14h. In this instance, the contents of the respective counters 14a to 14h are cleared in advance in response to reset signals 5e which are fed from the control pulse generator 5. The respective AND gates 13a to 13h are opened by the count pulses 5d, which are generated from the generator 5 in synchronism with the sampling pulses 5b, only when the scanning signals enter a preset image region, e.g., a block region 20 composed of the picture elements of $n \times m$ of FIG. 2 originating from coordinate $(X_S, Y_0)$. As a result, when the scanning operation of the aforementioned preset region 20 is finished, the counters 14a to 14h are stored with the number of appearances of the aforementioned amplitude relationships $n_0$ to $n_7$ between the picture element data at said region.

Figure 4:
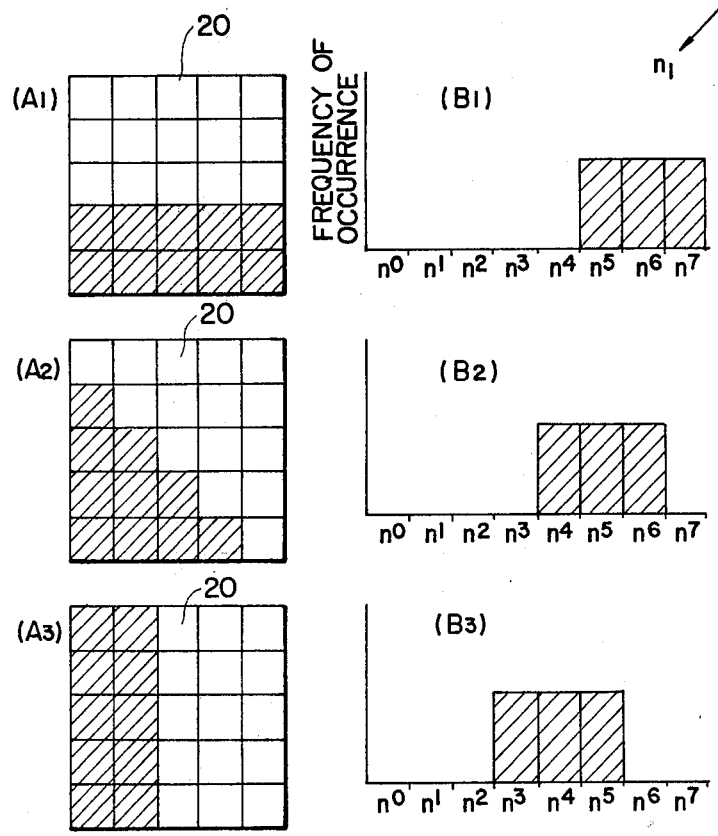
FIGS. 4($A_1$) to 4($A_3$) and 4($B_1$) to 4($B_3$) are explanatory views illustrating the relationships between the image patterns and the feature vectors of the present invention.

Here, let it be assumed that the aforementioned preset region 20 has such a relatively simple input image as has a "bright" upper portion and a "dark" lower portion, as shown in FIG. 4($A_1$). Then, at the respective image cut-out times, the relationships of $Sa=Sb$ and $Sc=Sd$ always hold. Since, moreover, there is no condition that the upper picture element data ($Sa$ or $Sb$) are smaller than the lower picture element data ($Sc$ or $Sd$), the directions of brightness to be detected in the example under consideration are limited to those of arrows $n_5$, $n_6$ and $n_7$ so that the frequency of occurences of the respective brightness directions is as shown in FIG. 4($B_1$). Likewise, the frequencies of occurences of the respective brightness directions when the image patterns of the preset region 20 are as shown in FIGS. 4($A_2$) and 4($A_3$) are as shown in FIGS. 4($B_2$) and 4($B_3$) so that the distributions of the frequencies become different from the image patterns.

In other words, the counted values ($N_0$ to $N_7$) of the counters 14a to 14h take different combinations in accordance with the geometrical feature of the image patterns contained in the preset region 20. If the input image is compared, while using the aforementioned counted values as the feature vectors, with the reference image which has already been taken, it is possible to judge whether or not there has been any change in the preset region.

In the processor of FIG. 1, the counted values ($N_0$ to $N_7$) of the aforementioned counters 14a to 14h are further fed to the linear transformation circuit 6, and the data 6S transformed are fed to a comparator 8 so that they may be compared with the corresponding reference data 7S which are read out of a memory 7. These operations are intended partly to eliminate the noises contained in the counted values $N_0$ to $N_7$ and partly to further simplify the feature data.

In the linear transformation circuit 6, for instance, $$\begin{pmatrix} f_1 \\ f_2 \\ f_3 \\ f_4 \end{pmatrix} = \begin{pmatrix} 0 & 2 & 3 & 2 & 0 & -2 & -3 & -2 \\ 3 & 2 & 0 & -2 & -3 & -2 & 0 & 2 \\ 0 & 3 & 0 & -3 & 0 & 3 & 0 & -3 \\ 3 & 0 & -3 & 0 & 3 & 0 & -3 & 0 \end{pmatrix} \begin{pmatrix} N_0 \\ N_1 \\ N_2 \\ N_3 \\ N_4 \\ N_5 \\ N_6 \\ N_7 \\ N_8 \end{pmatrix}$$

the above quasi-Fourier transformation is performed so that the Fourier coefficients $f_1$, $f_2$, $f_3$ and $f_4$ roughly descriptive of the pattern waveforms of FIGS. 4($A_1$) to 4($A_3$) are generated as the feature data 6S. It is needless to say that the above transformation need not always be of the Fourier type, but that similar results can be obtained by another transformation if the latter of linear type. In order to simplify the data, moreover, arithmetic treatments may be conducted such that the values are compressed or that the fractions are ignored.

Figure 5:
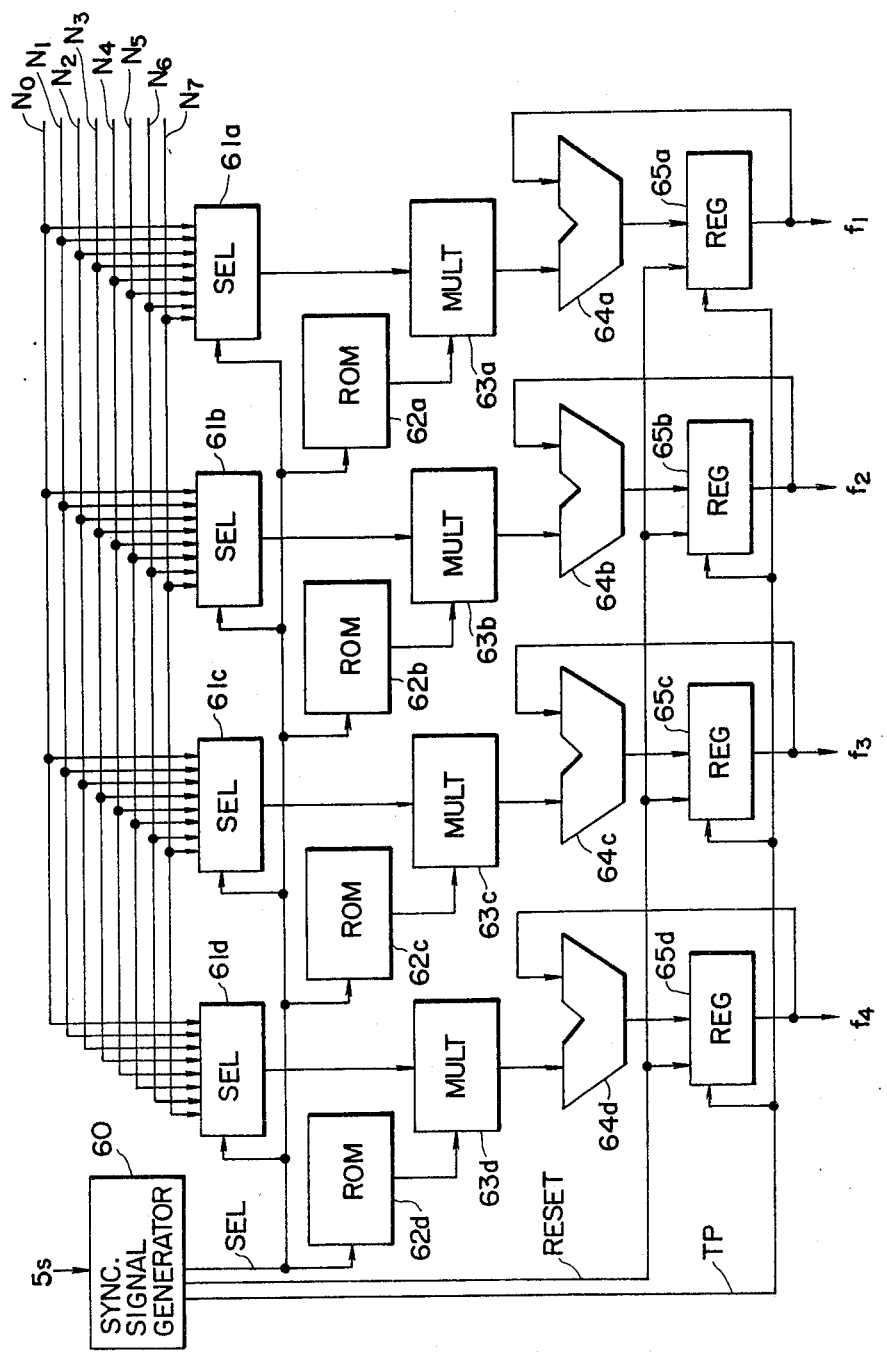
FIG. 5 is a block diagram showing one example of the concrete construction of a linear transformation circuit shown at block 6 in FIG. 1.

One example of the concrete construction of the linear transformation circuit is shown in the form of a block diagram in FIG. 5.

Figure 6:
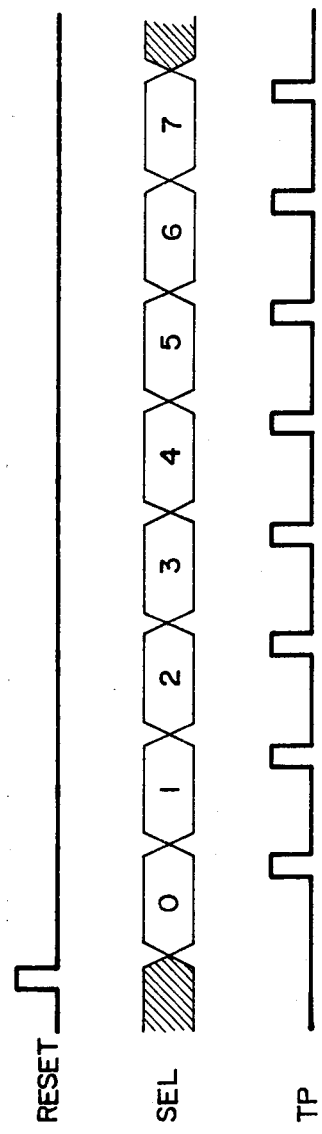
FIG. 6 is a diagrammatical view illustrating the waveforms of the control signals of the aforementioned linear transformation circuit.

In FIG. 5, characters $N_0$ to $N_7$ indicate the outputs of the counters 14a to 14h of FIG. 1, respectively, which also indicate the final counted values of one preset block region. Characters $f_1$ to $f_4$ indicate the output values after the linear transformation. Moreover, Letters SEL, RESET and TP indicate the output signals from a synchronous signal generator 60 which is started by the output pulses 5s from the control pulse generator 5 of FIG. 1. The output signals of the generator 60 are generated in the manners shown in the time charts of FIG. 6 each time the counted values $N_0$ to $N_7$ are established in each block region 20.

Characters 61a to 61d indicate selecting circuits for selecting one of the eight inputs $N_0$ to $N_7$ in response to the signals SEL. Characters 62a to 62d indicate read only memories (ROM) for generating the coefficients, which are stored in advance, in response to the aforementioned signals SEL, respectively. Characters 63a to 63d indicate multipliers for multiplying the outputs of the aforementioned selecting circuits 61a to 61d and the outputs of the ROMs 62a to 62d, respectively. Characters 64a to 64d indicate adders for adding the outputs of the aforementioned respective multipliers 63a to 63d to the calculated results which have been stored in registers 65a to 65d by that time.

The operations of the circuit of FIG. 5 will be described in the following.

First of all, the signals RESET are generated to reset the contents of the registers 65a to 65d to zero. Then, the signals SEL having a value "0" are generated. Each of the selecting circuits 61a to 61d selected the counted value $N_0$ at the position of the input "0" so that the coefficient in the address "0" is read out of each of the ROMs 62a to 62d. Each of the multipliers 63a to 63d multiplies the two signals fed thereto, whereas each of the adders 64a to 64d adds the aforementioned multiplied results and the contents of the registers 65a to 65d, which are at the "0" level in this instance. The respective added results are stored in the registers 65a to 65d in response to timing pulses TP.

The synchronous signal generator 60 generates the signals SEL at the value "1" subsequent to the aforementioned signals SEL at the value "0". Thus, the counted value $N_1$ at the input position of the "1" address and the coefficient read out of the "1" address position of the ROM are multiplied and added to the first multiplied result stored in the register so that the added results are stored in response to the signals TP.

Similar calculations are consecutively repeated in accordance with the values of the signals SEL which are generated from the synchronous signal generator 60.

When the eight signals SEL corresponding to the counted values $N_0$ to $N_7$ and the TP signals are generated, the aforementioned linear transformation circuit performs the calculation of the following Equation:

$$\sum_{i=0}^{7} a_{ij} \cdot n_i \longrightarrow f_j \, (j = 1, 2, 3 \text{ and } 4).$$

Then, the data $f_1$ to $f_4$ are established in the registers 65a to 65d.

Figure 2:
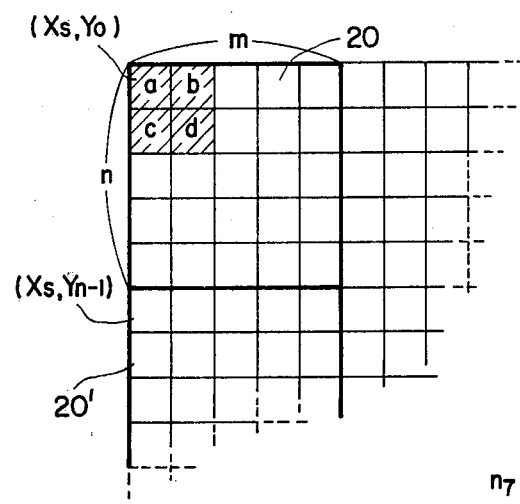
FIG. 2 is an explanatory view illustrating the extraction of picture element data.

The block region from which the feature vector is to be extracted is set, as shown in FIG. 2, at the region which is composed of the picture elements of $m \times n$ originating from the coordinate $(X_s, Y_0)$. And, the next block region is set at the region which is composed of the picture elements of $m \times n$ originating from the coordinate $(X_s, Y_{n-1})$. Then, during the scanning operation of one frame, a plurality of the block regions 20, 20' and so on can be continuously tested in a band shape in the Y direction. As a result, in the system shown in FIG. 1, the control pulse generator 5 is made to generate the signals 5d, while shifting the X coordinate by m picture elements for each frame, so that the whole area of the image can be tested by the plural times of the scanning operations.

The control pulse generator for generating the signals 5d with a periodic shift can be easily designed by the combinations among a clock generator, (plural) counters, (plural) coincidence circuits and the like if reference is made to the aforementioned U.S. Pat. No. 3,936,800. For each frame, on the other hand, the control pulse generator may be supplied with the coordinate data assigning the block regions from a computer constituting such a main controller of an elevator control system as makes use of the output results of the image data processor according to the present invention.

In case a plurality of block regions are to be continuously processed in a band form in the Y direction during the scanning operations of one frame, it is sufficient that the linear transformation circuit 6 shown in FIG. 5 can finish the data transformation during the time period after the counted data for one block region are established by the feature extraction circuit 4 of the precedent stage and before the counting operation is started for the next block region. If there is provided at the input stage of the linear transformation circuit 6 a register which is made operative to temporarily store the counted data $N_0$ to $N_7$ in a manner to correspond to the counters 14a to 14h, it is sufficient that the aforementioned data transformation can be finished by the time the counted data for the next block region are established, thus making it possible to efficiently consume the time.

As has been apparent from the foregoing description, the image data processor according to the present invention can enjoy an advantage that it is hardly influenced by the contrast and level in the image due to the fluctuations in an image pickup device or in an illuminating condition because the feature of the image is extracted by using only the amplitude relationship between the image data of two picture elements which are in spacially preset relative position relationships.

On the other hand, since the feature extracting unit can be constructed of such a simple circuit as can be assembled of inexpensive elements such as comparators or adders, the price of the data processor can be reduced. Since, moreover, the geometrical feature at the pattern contour in the image is extracted, another advantage is that the change of an object in a scene can be sensitively captured.

The processor according to the present invention can be applied to a guest number detector which is monitoring an elevator hall to detect the number of guests from the size of such a region as is the inconsistency from the background image fed in advance when there is no guest. In this application, the image plane is divided into plural blocks, and the input image is compared, while shifting the block from which the feature is to be extracted, with the background image read out of a memory so that the number of the quests can be presumed by integrating the compared results of all the blocks.

What is claimed is:

1. An image data processor comprising:
   first means (1 and 2) for converting an image including an object to be recognized into spacially quantitized picture element signals;
   second means (3) for extracting plural pairs of the picture element signals, which are in spacially preset relative position relationships, from the output of the first-named means while sequentially shifting the picture element positions to be extracted;
   third means (4) connected with the second-named means for counting the number of occurences of preset amplitude relationships between the plural pairs of the input signals when the output signals from the second-named means indicate the picture elements which are included in a preset region of the image;
   fourth means (7) for dividing a reference image into a plurality of regions to store in advance the feature data of each of the divided regions; and
   fifth means (8) for sequencially comparing the counted data generated from the third-named means and those data of the fourth-named means, which correspond to said preset regions, whereby the object in the image is recognized from the compared results of the fifth-named means.

2. An image data processor comprising:
   first means (1 and 2) for converting an image including an object to be recognized into spacially quantitized picture element signals;
   second means (3) for extracting plural pairs of the picture element signals, which are in spacially preset relative position relationships, from the output of the first-named means while sequentially shifting the picture element positions to be extracted;
   third means (4) connected with the second-named means for counting the number of occurences of preset amplitude relationships between the plural pairs of the input signals when the output signals from the second-named means indicate the picture elements which are included in a preset region of the image;
   linear transformation means (6) for converting the relationships between the counted data generated from the third-named means and the paired picture elements corresponding thereto into one-dimentional data;
   fourth means (7) for dividing a reference image into a plurality of regions to store in advance the feature data of each of the divided regions; and
   fifth means (8) for sequentially comparing the data generated from said linear transformation means and those data of the fourth-named means, which correspond to said preset regions, whereby the object in the image is recognized from the compared results of the fifth-named means.

3. An image data processor as set forth in claim 1 or 2, wherein the third-named means includes:
   a plurality of comparators made receptive of a pair of the picture element signals from the second-named means for generating signals when a preset amplitude relationship resides among the input signals;
   a plurality of counters provided for said comparators, respectively, for accomplishing their counting operations in accordance with the output signals of said comparators, respectively; and
   means for presetting the operating periods of said counters, respectively.

* * * * *